No. 770,155. PATENTED SEPT. 13, 1904.
H. H. BIGHOUSE.
CONVEYER.
APPLICATION FILED AUG. 8, 1900.
NO MODEL. 2 SHEETS—SHEET 1.
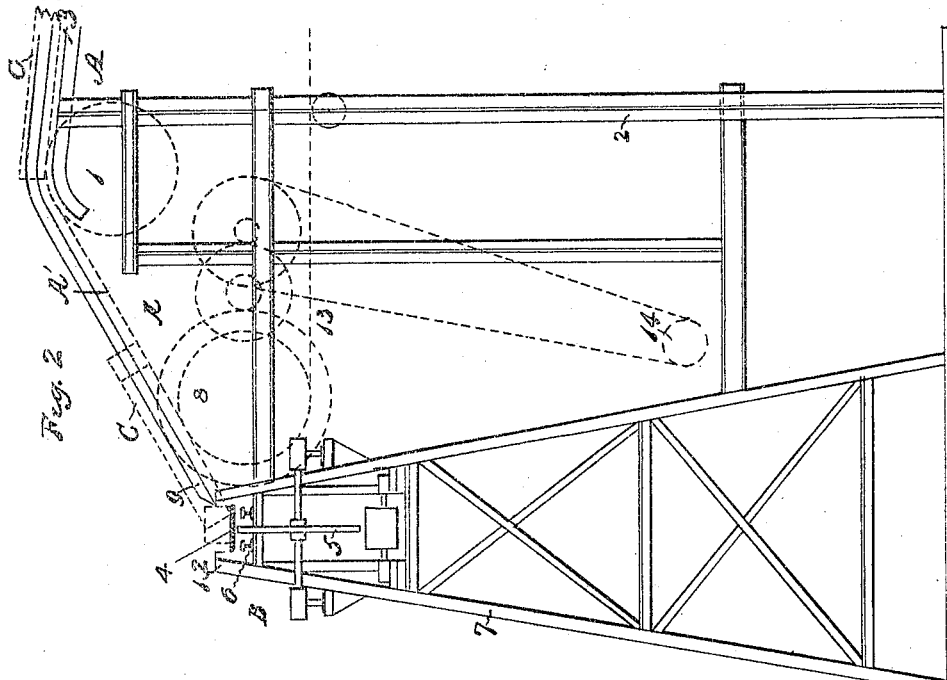
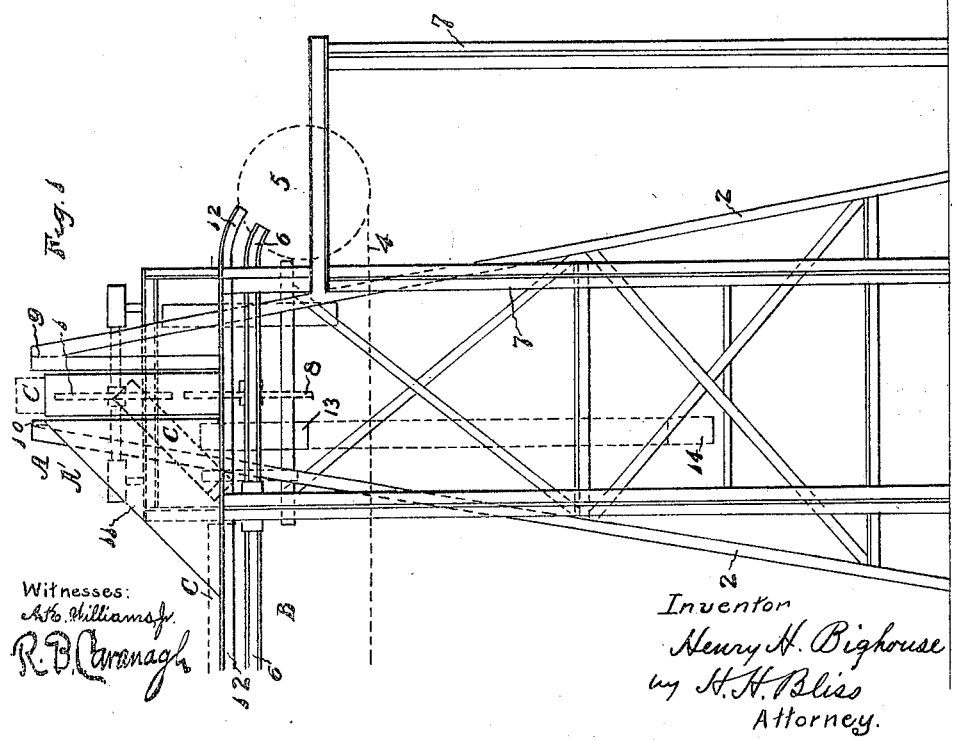
Witnesses:
Inventor
Henry H. Bighouse
by H. H. Bliss
Attorney.

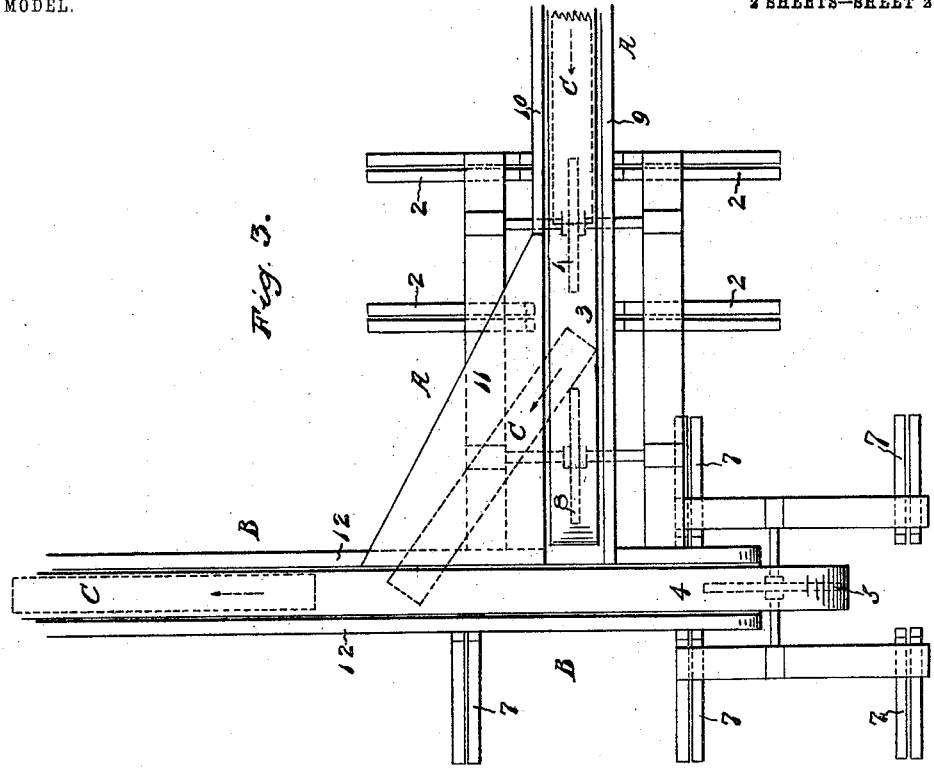

No. 770,155. Patented September 13, 1904.

UNITED STATES PATENT OFFICE.

HENRY H. BIGHOUSE, OF CANTON, OHIO, ASSIGNOR TO THE AULTMAN COMPANY, OF CANTON, OHIO, A CORPORATION OF OHIO.

CONVEYER.

SPECIFICATION forming part of Letters Patent No. 770,155, dated September 13, 1904.

Application filed August 8, 1900. Serial No. 26,289. (No model.)

*To all whom it may concern:*

Be it known that I, HENRY H. BIGHOUSE, a citizen of the United States, residing at Canton, in the county of Stark and State of Ohio, have invented certain new and useful Improvements in Conveyers, of which the following is a specification, reference being had therein to the accompanying drawings.

Figure 1 is an elevation of a conveying mechanism embodying my invention. Fig. 2 is an elevation looking toward the right-hand end of Fig. 1. Fig. 3 is a detail view of a portion of the same.

My invention relates to mechanism designed for the conveying by endless belts of materials or substances in the form of long blocks, billets, or bars, and has especial reference to means for changing the direction of conveyance of such articles and transferring them from one conveyer to another in such manner that the billet or bar lying longitudinally upon the first conveyer shall also lie longitudinally upon the second conveyer running at an angle to the first, whereby conveyer-belts may be employed of comparatively narrow dimensions sufficient to accommodate the widths of the articles conveyed without regard to the length of such articles.

Referring to the drawings, A indicates the first conveyer adapted for the transportation of articles of the character above referred to and which is or may be of the general construction described in my application, Serial No. 26,290, of even date herewith. The supporting means at one end of said conveyer comprises a wheel or pulley 1, carried by a suitable supporting-frame 2 at the desired elevation. The supporting and guiding devices at the other end of said conveyer, with which may be combined any preferred means for feeding or supplying to the conveyer the articles to be carried, is not illustrated nor is such illustration necessary to an understanding of the present invention. A portion of the truck-supporting track is indicated at 3, adapted to support the truck-wheels of the conveyer, which may be of any well-known construction in which traction wheels or rollers are used for supporting the conveyer-sections.

B indicates the second conveyer running at right angles or at other desired angle to the conveyer A and comprising the endless belt 4, preferably formed of the linked trucks described in my other application above referred to, an actuating or guiding wheel or pulley 5 at one end of said belt, (the actuating or guiding means at the other end being of any suitable character not necessary to be herein shown or described,) and a track 6. The conveyer B is carried by a frame 7 at the desired elevation.

I will now describe the means for guiding the articles to be carried and enabling them to be transferred by the mere action of the conveyers from a longitudinal position on the conveyer A to a similar longitudinal position on the conveyer B.

8 is a deflecting means for the conveyer A, by which the delivering end of the same is carried or dipped downward from the wheel 1 to a point in proximity to the upper limb of the conveyer B, such deflecting means consisting, preferably, of a wheel of suitable character (similar to the wheel 1) to engage and support or actuate the links of the conveyer and the conveyer as a whole. At one side of the conveyer A is a confining or guiding means 9, such as a board or rail parallel with the conveyer at the edge of its conveying-surface, (the right-hand edge, as viewed in Fig. 1,) and at the other side of the conveyer A is a similar guiding or confining means 10. The guide 10 is, however, cut away or removed for all or a portion of the downwardly-extending part A' of the conveyer A, and where it is so removed I provide a support 11, such as a flat metallic or wooden platform or plate, which is substantially flush and parallel with the upper surface of the conveyer portion A' and extends, preferably, to and for a short distance along the inner edge of the guiding means of the conveyer B. This latter guiding means consists of side boards or plates 12, carried by the frame 7 and properly related to the upper limb of the conveyer B to maintain thereon the articles being carried.

The relatively long blocks or billets, which are shown at C, are brought forward on the upper limb of the conveyer A between the guiding devices 9 and 10 and pass over the wheel 1 and down the inclined conveyer portion A'. Their movement continues until their lower ends encounter the upper surface of the conveyer B, whereupon the lower end of each bar or billet so engaging the second conveyer is carried thereby transversely of the conveyer portion A', (to the left in Fig. 1,) the rear end of such billet remaining on and being still advanced by said inclined conveyer portion. During this movement of the billet its middle portion will pass partly over or across the plate 11 and the billet changes its position from parallelism with the conveyer portion A' to parallelism with the conveyer B, its rear end finally being delivered from the lower end of the conveyer portion A' to or near the conveyer B, its final delivery upon the second conveyer being facilitated or insured, if necessary, by a sliding or rolling movement on the lower part of the plate 11. In Fig. 1 one of such billets is indicated as just passing over the wheel 1, another as being transferred over the plate 11 from the first to the second conveyer, and a third as being finally delivered to and conveyed away by the belt 4.

The conveyer A is preferably actuated from its delivery end, as by means of power-transmitting devices 13 and a motor or power shaft 14.

The deflection or downward inclination of the conveyer A, as at A', is important, as I am thereby enabled to cause the articles delivered thereby to impinge upon the surface of the conveyer B, so as to be engaged and moved laterally thereby. The conveyers are thus not only at an angle to each other with respect to their general directions, but the supporting and delivering surface of the delivering-conveyer is at an angle to the upper surface of the receiving-conveyer.

It will be understood that the entire length of the delivering-conveyer may have the "dip" or inclination hereinbefore referred to; also that the apparatus embodying my invention may have several transfers from one conveyer to another, the receiving-conveyer B acting as the delivering-conveyer for a subsequent conveyer and being arranged with the described dip or inclination for the purpose.

What I claim is—

1. In a conveyer mechanism, the combination of a delivering-conveyer, a receiving-conveyer running at an angle thereto and a side guide along the delivering-conveyer extending above its surface, which guide is terminated or partly removed at a point remote from the receiving-conveyer to permit the articles conveyed to extend at an angle to both of said conveyers, whereby the forward end of such article is conveyed in one direction by the receiving-conveyer while the rear end of such article is conveyed in another direction by the delivering-conveyer, substantially as set forth.

2. In a conveying mechanism for the conveyance and transfer from one conveyer to another of relatively long billets or other articles, the combination of a delivering-conveyer having guides 9 and 10, and a receiving-conveyer running at an angle to the other and having guiding means 12, the guide 10 toward the delivering end of the receiving-conveyer being partly removed leaving a space between the end of said guide and the nearer side of the receiving-conveyer to permit the lateral movement of the article from the delivering-conveyer, substantially as set forth.

3. The combination of a delivering-conveyer, a receiving-conveyer running at an angle thereto, the guide 9 at one side of the delivering-conveyer, the partly-removed guide 10 at the other side of the delivering-conveyer toward the delivery end of the receiving-conveyer, and the supporting means 11 in the angle between said conveyers.

4. The combination of a receiving-conveyer, a delivering-conveyer extending and delivering directly thereto and having the conveying-surface of its delivery end running both at an angle to the receiving-conveyer as a whole and at an angle to the receiving-surface of the receiving-conveyer, and guiding means adapted to permit the transfer of relatively long articles from the delivering to the receiving conveyer.

5. The combination of a receiving-conveyer, a delivering-conveyer, running at an angle to the first conveyer and having its delivery portion A' deflected from the main course of the conveyer and running downward at an angle to the surface of the receiving-conveyer, and guiding devices at the sides of said conveyer one of said devices being partly removed to permit the transfer of relatively long articles, substantially as set forth.

6. The combination with the conveyer B having the guiding means 12, of the conveyer A having the downwardly-extending portion A', the guide 9 at one edge, the partly-removed guide 10 at the other edge and the plate or platform 11 in the angle between said conveyers, substantially as set forth.

7. The combination of the frame 7, the conveyer B mounted thereon and having the guiding devices 12, the truck-rails 6 on said frame, the conveyer A having the downward-extending inclined portion A', the frame 2 whereby the conveyer A is supported above the conveyer B, guiding means 9 at one side of said conveyer, the guide 10 at the other side of said conveyer, and the transfer-plate or platform 11 in the angle between said conveyers.

8. The combination of the conveyer A having the downwardly-extending portion A', the conveyer B running at an angle to the first-mentioned conveyer, and the plate or platform 11 having one edge substantially flush with the upper surface of the portion A' and having its other edge extending along the conveyer B, substantially as set forth.

9. In a conveyer mechanism, the combination of the delivering-conveyer, a receiving-conveyer running at an angle thereto, and side guides along the delivering-conveyer extending above its surface, one of which guides toward the delivery end of the receiving-conveyer is terminated or partly removed to permit the articles conveyed to extend at an angle to and to rest upon both said conveyers, whereby the forward end of such article is conveyed in one direction by the receiving-conveyer while the rear end of such article is conveyed in another direction by the delivering-conveyer, substantially as set forth.

10. In a conveyer mechanism for billets or similar articles, the combination of a receiving-conveyer, and a delivering-conveyer having its conveying-surface or plane running both at an angle to the receiving-conveyer laterally and at an angle vertically to the receiving-surface of the receiving-conveyer, whereby a billet or similar article conveyed while lying flat upon the delivering-conveyer is caused to impinge at its forward end upon the surface of the receiving-conveyer and by the action of the latter to be partly lifted from the delivery-conveyer to allow the turning or twisting of the article at its rear end upon the delivering-conveyer as it is advanced by the latter, substantially as set forth.

11. In a conveyer mechanism, the combination of a receiving-conveyer, and a delivering-conveyer running at an angle laterally to the first conveyer and having its delivering portion A' deflected from the main course of the conveyer and running downward at an angle to the surface of the receiving-conveyer, substantially as set forth.

12. In a conveyer mechanism for billets or similar articles, the combination of a receiving-conveyer, a delivering-conveyer running at an angle thereto, guiding means for the articles conveyed adapted to permit said articles to extend at an angle to both of said conveyers, and a plate or platform in the angle between the said conveyers adapted to support the articles while they are being transferred from one conveyer to the other, substantially as set forth.

In testimony whereof I affix my signature in presence of two witnesses.

HENRY H. BIGHOUSE.

Witnesses:
 PRIMUS PHILIPPI,
 WM. A. LYNCH.